United States Patent [19]

Frey

[11] Patent Number: 5,372,162

[45] Date of Patent: Dec. 13, 1994

[54] REPAIR DEVICE FOR THE IN SITU REPAIR OF PIPES, AND A METHOD OF REPAIRING PIPES

[76] Inventor: Andre F. Frey, 45, Rue Saint-Erhard, 67100 Strasbourg, France

[21] Appl. No.: 26,976

[22] Filed: Mar. 5, 1993

[30] Foreign Application Priority Data

Mar. 6, 1992 [FR] France ............... 92 02875

[51] Int. Cl.⁵ ........................... F16L 55/18
[52] U.S. Cl. ........................ 138/98; 138/97; 138/93; 405/154; 264/270
[58] Field of Search .............. 138/93, 97, 98; 405/150.2, 154; 264/36, 270; 118/DIG. 10, 105; 427/230; 156/287

[56] References Cited

U.S. PATENT DOCUMENTS

| | | | |
|---|---|---|---|
| 2,851,061 | 1/1955 | Bernard et al. | 138/97 |
| 3,058,137 | 10/1962 | Doyle et al. | 118/DIG. 10 |
| 3,125,464 | 3/1964 | Harmes | 118/DIG. 10 |
| 3,356,777 | 12/1967 | Barrett | 264/36 |
| 3,885,521 | 5/1975 | Arx | 118/DIG. 10 |
| 3,958,607 | 5/1976 | Gray | 138/97 |
| 4,272,984 | 6/1981 | Bell | 138/93 |
| 4,314,577 | 2/1982 | Brister | 138/93 |
| 4,371,569 | 2/1983 | Muta et al. | 427/230 |
| 4,377,984 | 3/1983 | Donnelly | 118/105 |
| 4,429,720 | 2/1984 | Beck et al. | 138/97 |
| 4,449,584 | 5/1984 | Christensen | 138/93 |
| 4,691,728 | 9/1987 | Hathison | 138/93 |
| 4,848,964 | 7/1989 | Yarnell | 405/154 |
| 4,898,498 | 2/1990 | Akesaka | 405/154 |
| 4,954,016 | 9/1990 | Storgard | 138/97 |
| 4,955,755 | 9/1990 | Frey | 405/155 |
| 5,195,392 | 3/1993 | Moore et al. | 138/97 |

FOREIGN PATENT DOCUMENTS

| | | |
|---|---|---|
| 0146331 | 6/1985 | European Pat. Off. . |
| 1398057 | 3/1965 | France . |
| 2461189 | 3/1981 | France ............... 138/93 |
| 2579294 | 11/1987 | France . |
| 9109334 | 10/1991 | Germany . |
| 16950 | of 1913 | United Kingdom . |
| 990622 | 4/1965 | United Kingdom . |
| 2171486 | 8/1986 | United Kingdom . |
| WO8703353 | 6/1987 | WIPO . |

Primary Examiner—James E. Bryant, III
Attorney, Agent, or Firm—Hayes, Soloway, Hennessey, Grossman & Hage

[57] ABSTRACT

A repair device for the in situ repair of a pipe comprises an assembly of at least four short cylindrical, inflatable members 1, 2, 3, 4, which are interconnected by articulated rods 5 which are each articulated by means of a cardan joint 6. When in the pipe, the inflatable members define a cavity 10 for receiving a filler material 7'. Ducts 8 are provided for individually connecting the inflatable members to a source of compressed inflating fluid, and a duct 22 is provided for conveying the filler material to the cavity 10. The outermost inflatable members are provided with attachments for securing a cable or chain 9 thereto. This construction permits the complete and continuous repair of the pipe during advancement of the assembly of inflatable members, even in the region of shoulders 12, internal projections 13, connections with lateral pipelines 14, or bends 12', while ensuring that the injection chamber 10 remains filled with filler material 7'.

16 Claims, 4 Drawing Sheets

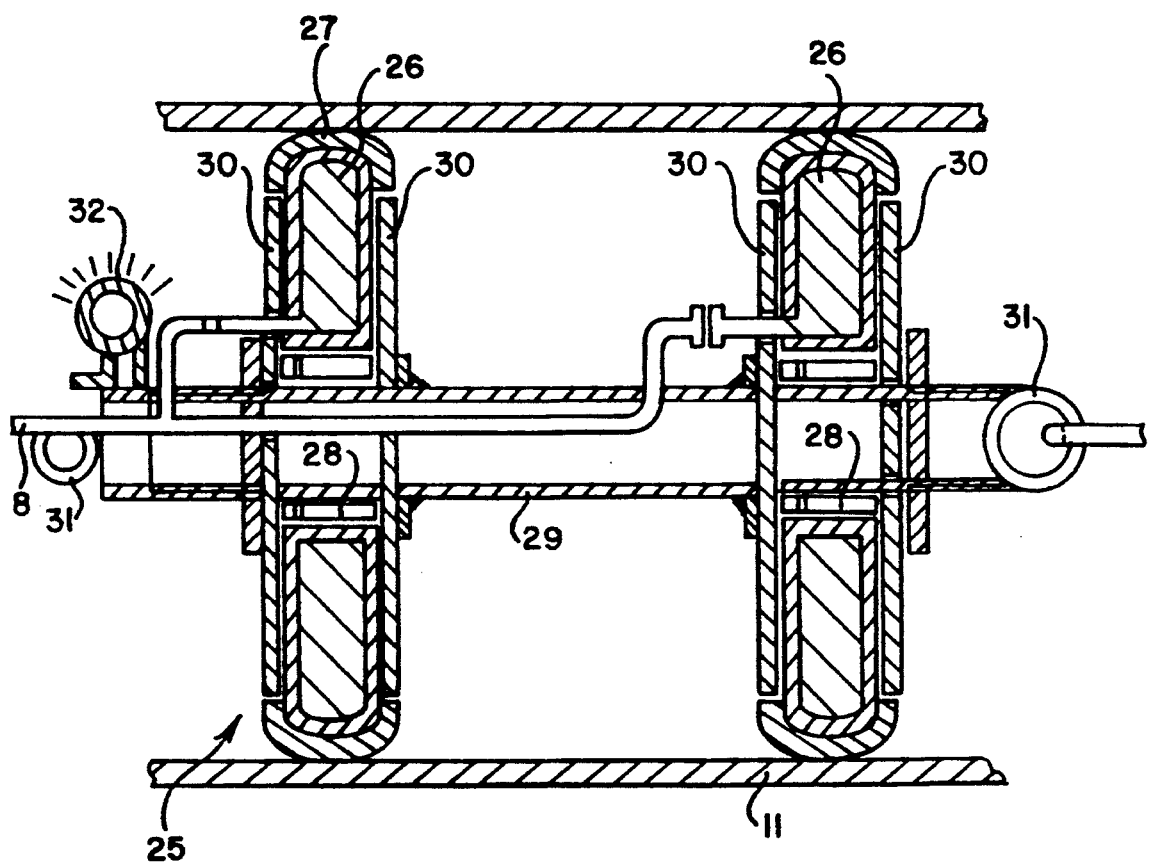
FIG. IE

REPAIR DEVICE FOR THE IN SITU REPAIR OF PIPES, AND A METHOD OF REPAIRING PIPES

FIELD OF THE INVENTION

This invention relates to the repair of pipes or other conduits (hereinafter simply referred to as pipes) which are not directly accessible from the outside and which cannot be examined from within because they are too small. More particularly, the invention relates to a device for the in situ repair of such pipes, and also to a method of repairing such pipes.

BACKGROUND OF THE INVENTION

Leakages resulting from fissures, cracks, defective jointing or the like, in pipes which are laid in the ground for the supply and removal of liquids, frequently cause serious pollution and contamination problems, either in respect of the surrounding subsoil or in respect of the liquid that is being conveyed, and it is generally necessary that the pipes be brought to the surface, resulting in long and tedious road works.

Devices for the in situ restoration of inaccessible pipes by injecting a filler product are known, in particular devices which comprise one or more modules which have a cylindrical shape and a variable diameter, and are introduced into the pipe, and are then drawn along therein.

However, these devices can only restore those sections of the pipe that are situated between two manholes, the first manhole being used for the introduction of the device, and the second one for drawing it along by means of a cable or pulling chain. Furthermore, it is not possible to use these devices in pipes which have substantial shoulders or internal projections.

Other devices are known, such as the device described in French Patent 2 579 294, which are suitable only for pipes having a diameter which is sufficiently large and falls within a relatively restricted range of values. Their structural modification, with a view to extending their use to pipes of variable diameters, would be a long and tedious task, due to their complex structure.

Furthermore, as they comprise rigid elements of relatively great length, the above-mentioned two types of device cannot be used in pipes having substantial shoulders, internal projections or bends.

Finally, U.S. Pat. No. 4,429,720 describes a continuous flexible tubular body, comprising an inflatable front part and an inflatable rear part, which parts, between them, define an injection chamber for a product to repair the pipes.

The body must, however, be positioned exactly at the site where the repair is to be carried out, the site first having been identified by the injection of compressed air. The filler and a catalyst are then separately injected into the empty chamber defined by the inflatable parts and, once the repair has been carried out, the tubular body must again be withdrawn and cleaned for the following repair operation.

Moreover, in order to use the tubular body, two manholes are required and the tubular body cannot be advanced in a pipe which has internally projecting obstacles. Its rate of displacement is also very low, due to the advancement method used.

It is an object of the present invention to overcome the above-mentioned drawbacks.

SUMMARY OF THE INVENTION

According to the invention there is provided a repair device for the in situ repair of a pipe by the application of a filler material to the internal wall of the pipe, which device comprises an assembly of at least four short cylindrical, inflatable members, which inflatable members in use define in the pipe a cavity for receiving the filler material, each pair of adjacent inflatable members being connected to one another by an articulated tie rod capable of transmitting a substantial axial force from one said inflatable member to the other whilst permitting the inflatable members to articulate freely with respect to one another, first duct means for conveying an inflating fluid to the inflatable members, and second duct means for conveying said filler material to said cavities.

Further according to the invention there is provided a method of repairing a pipe in situ, which comprises, firstly, exploring, by means of a camera, the pipe by topographically recording major faults and placing stops in any lateral pipelines leading into the pipe, then introducing a repair device as defined in the preceding paragraph via a manhole into the pipe, and displacing the repair device along the pipe while maintaining the injection chamber continuously filled with filler material, and stopping the repair device in the region of each of the major faults which were previously recorded, for a sufficiently long time to repair the fault.

BRIEF DESCRIPTION OF THE DRAWINGS

The invention will now be described in more detail, by way of example, with reference to the accompanying drawings.

In the drawings:

FIGS. 1A to 1E are longitudinal sections of the various members forming a repair device in accordance with the invention.

DETAILED DESCRIPTION OF PREFERRED EMBODIMENT

Figure 1A:
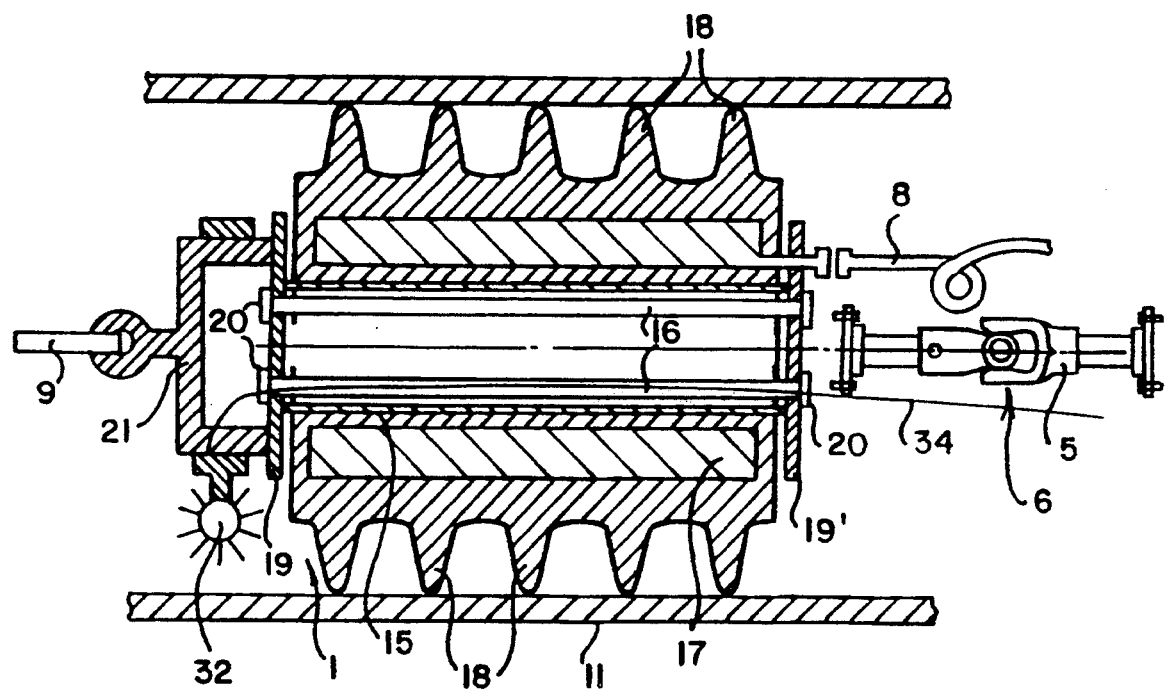
Figure 1B:
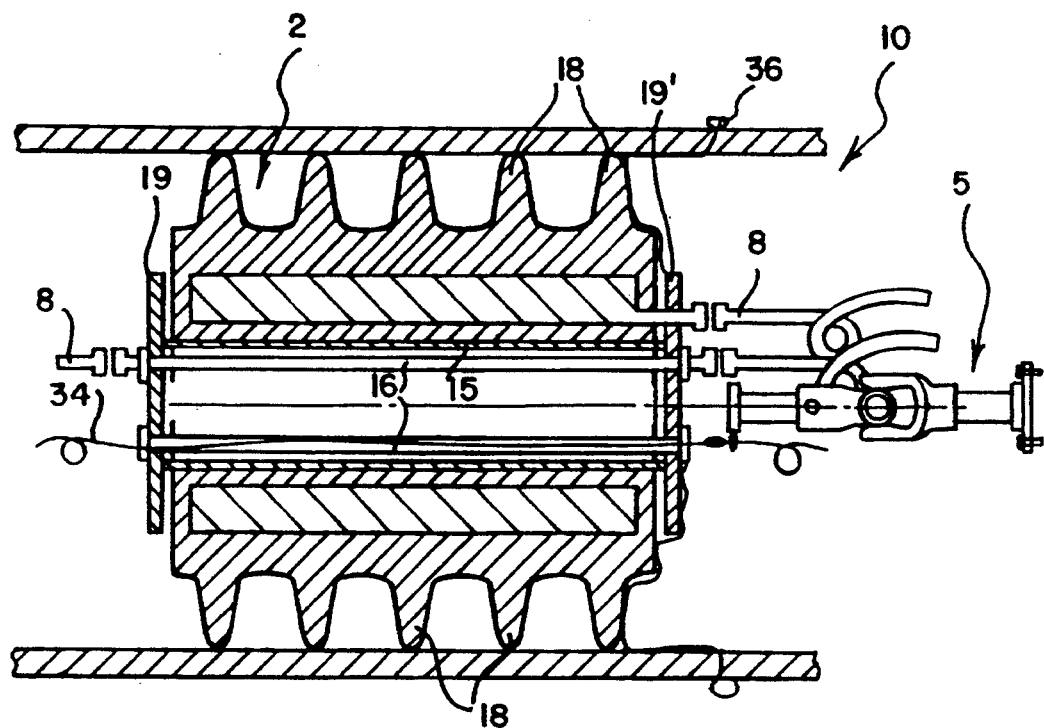

As shown in FIGS. 1A to 1D and 2A to 2D, the repair device is essentially formed by an assembly of at least four short cylindrical inflatable members 1, 2, 3, and 4 which are interconnected by tie rods 5. The inflatable members have a length which is less than about one and a half times their diameter, and preferably about the same as their diameter. The tie rods 5 are articulated by each being provided with a cardan joint 6. The inflatable members are connected to means 7 for the supply of pressurized filler material 7' and to means 8 for the supply of inflating fluid, as well as to means 9 for drawing and/or withdrawing them to injection and to drive means respectively, which are located above ground and are provided with corresponding control means. The assembly of members 1, 2, 3, and 4 permits the delimitation in the pipe 11 of a permanent injection chamber 10 for pressurized filler material 7', thus permitting the complete and continuous repair of the pipe during travel of the assembly along the pipe. In other words, the assembly of members ensures that the injection chamber 10 is continuously filled with filler material 7'. This is so even in the region of shoulders 12, internal projections 13, connections 14 with secondary pipelines, or bends 12'.

The articulated tie rods 5 make it possible, because of the cardan joints 6, to transmit a substantial axial force, which permits the introduction of the inflatable members 1, 2, 3 and 4 and the advancement of the members along the pipe 11, by thrust exerted from behind, in particular when operating in a pipe 11 from a single manhole. The articulated tie rods also make it possible for each inflatable member 1, 2, 3, and 4 to pivot freely in all directions relative to the adjacent member, enabling the assembly of inflatable members to travel through bends of up to 90°.

It is a first characteristic feature of the invention, as shown in FIGS. 1A to 1D, that the similarly constructed inflatable members 1, 2, 3, and 4, each comprise a tubular support body 15, in which is disposed, in a fixed manner, a plurality of rigid pipes 16 which project beyond the two ends of the support body. The support body is encircled by an inflatable annular sleeve 17 which has, on the outside thereof, radially extending ribs 18, and is located axially by means of two end plates 19, 19'. The end plates 19, 19' are mounted on the projecting ends of the rigid pipes 16 and are secured by means of detachable fixing means 20.

The ribs 18 may be of an elastic materials, such as a polymer or a synthetic rubber, and are formed integrally with the inflatable sleeves 17. The wear to which the ribs are subjected as a result of their contact with the wall may be reduced by coating the ribs with a material by vulcanization.

The inflatable annular sleeve 17 may be changed very readily and rapidly, if it is desired to adapt the inflatable members 1, 2, 3 and 4 to a pipe 11 having a particular diameter, by removing one of the two end plates 19 or 19', once the fixing means 20 have been removed. The fixing means 20 may, for example, be in the form of nuts.

The articulated tie rods 5, which are of variable length, are preferably firmly fixed, in a detachable manner, to facing end plates 19, 19' of the inflatable members. The outer end plates 19 and 19' of the extreme members 1 and 4 are provided with attachment means for securing the cable 9 or the drawing or withdrawing chain, connected to a winch or similar device located above ground (not illustrated). The winch or similar device is advantageously manually or electrically operated, to minimize noise.

Another characteristic feature of the invention, as shown in FIGS. 1A to 1D, is that the inflating fluid supply means 8 are in the form of flexible pipes which are connected to a compressor device located above ground (not illustrated), which feeds each of the four inflatable members 1, 2, 3, and 4 independently. Furthermore, the supply means 7 for filler material 7' which is prepared above ground and is ready for use, is in the form of a semi-rigid tube 22 connected, by means of a quick coupler 23, to one of the rigid pipes 16 of the rearmost inflatable member 4, the subsequent transfer of filler material 7' into the injection chamber 10 taking place through a connecting tube 24 and a rigid pipe 16 of one of the intermediate inflatable members 2 or 3, which define the injection chamber 10.

The length of the injection chamber 10 is directly dependent on the length of the tie rod 5 which connects the inflatable members 2 and 3, and may consequently be adjusted according to the dimension of the fault, such as the fissures 36, that is to be treated.

The semi-rigid design of the tube 7 makes it possible, when the pipe 11 is provided with only one manhole, for the assembly of inflatable members 1 to 4 to be introduced by successive thrusts exerted on the tube 7. Alternatively, push rods (not illustrated) may be used to push the assembly of inflatable members through the pipe.

The flexible supply pipes 8 for inflating fluid, in particular compressed air, which are made up of pipe sections which are releasably interconnected by means of connectors, may advantageously pass through the interposed inflatable members 4, 3 or 2, via their rigid pipes 16.

The preparing and injecting device for the filler material 7', which may include a mixer, a pump, and an air compressor, may advantageously be installed in or on a vehicle, such as a truck or a light delivery van.

According to a preferred embodiment of the invention, the repair device also comprises an additional cylindrical scraper member 25 (FIG. 1E) which is provided with at least two inflatable collars 26 and may be connected to the assembly of inflatable members 1 to 4 by means of an articulated tie rod 5. Alternatively, it may be operated separately by being pulled through the repaired pipe 11, once the assembly of inflatable members 1 to 4 has been withdrawn completely.

As can be seen in FIG. 1E, the scraper member 25 may comprise, advantageously, two inflatable collars 26, which are provided on their outer surface with a reinforcing layer 27 and are mounted, if required with the interposition of spacers 28 having a variable length, on a rigid hollow pipe 29. They are held located axially by means of end plates 30, which are mounted on the rigid pipe 29 in such a manner as to be detachable.

When the scraper member 25 is operated independently, it is drawn through the repaired section of the pipe 11 and moved to and fro by means of one or two pulling cables which are attached via attachment means 31 connected to the ends of the hollow pipe 29, for purposes of smoothing the wall before the filler material 7' sets completely.

Figure 1C:
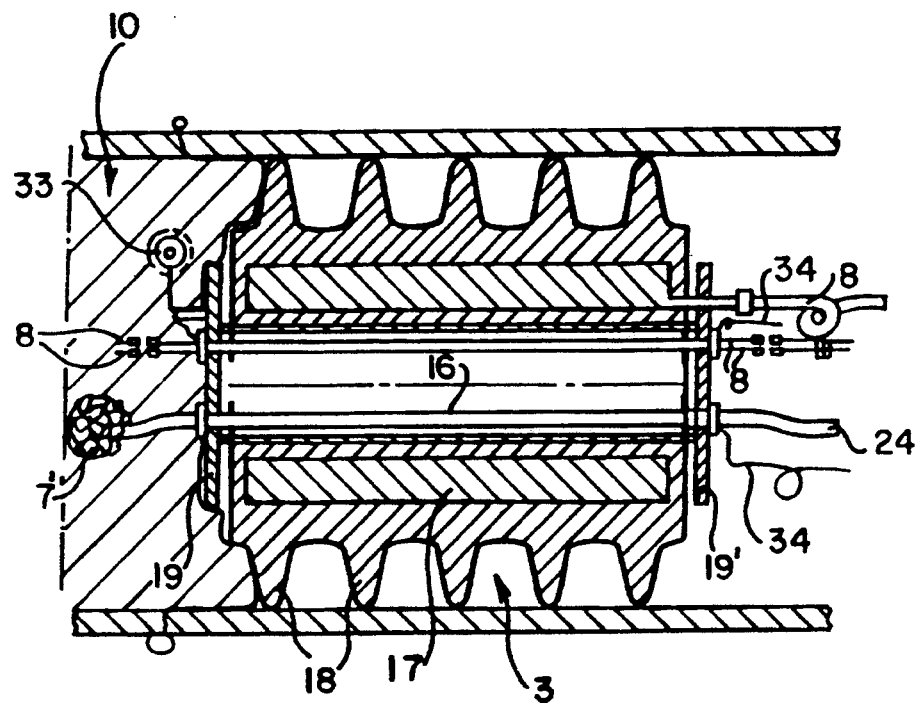
Figure 1D:
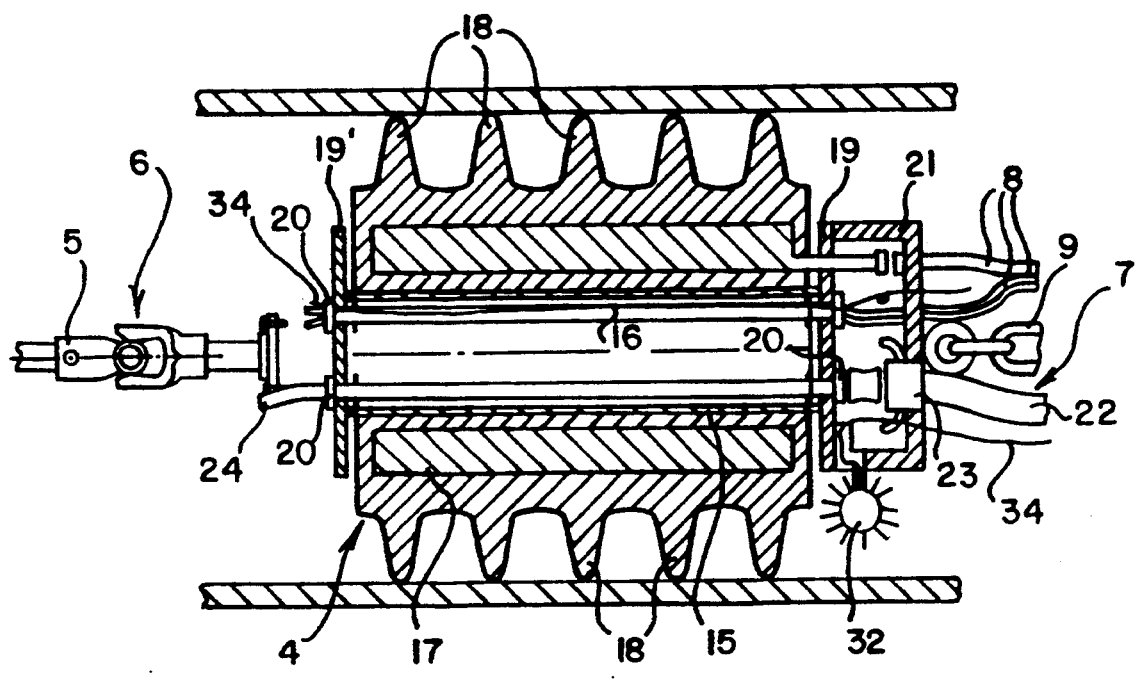
Figure 2A:
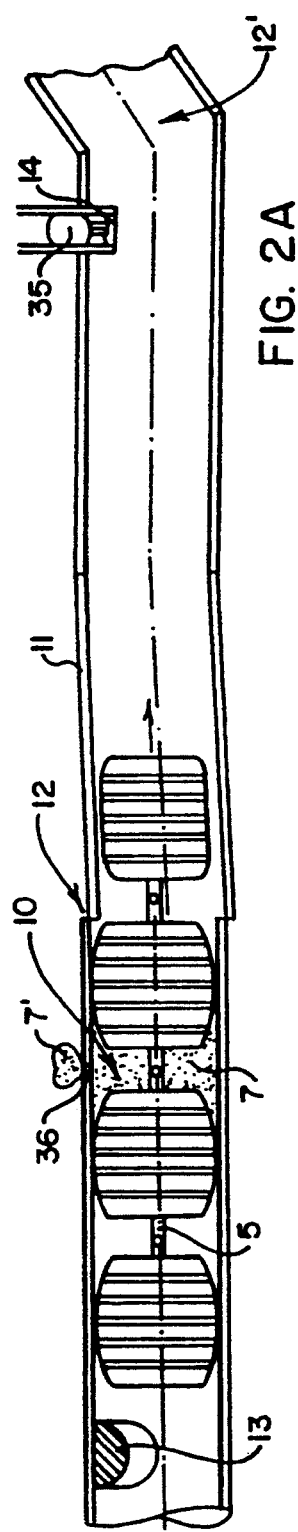
FIGS. 2A to 2D diagrammatically show the repair device while passing a shoulder in a pipe being repaired.
Figure 2B:
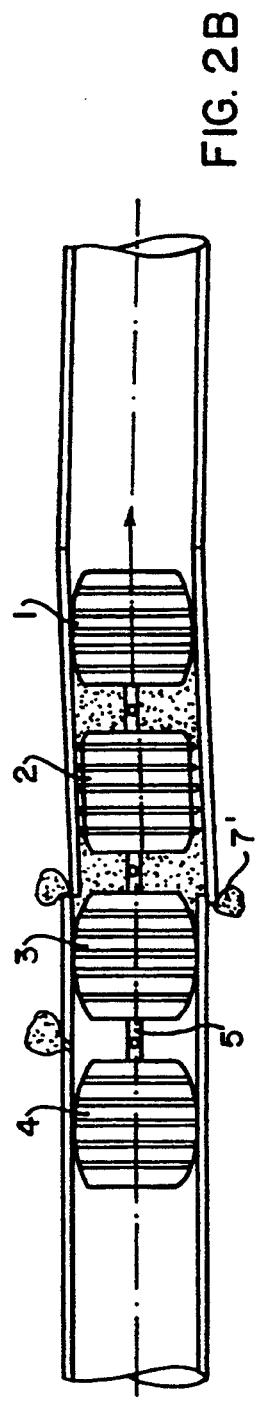
Figure 2C:
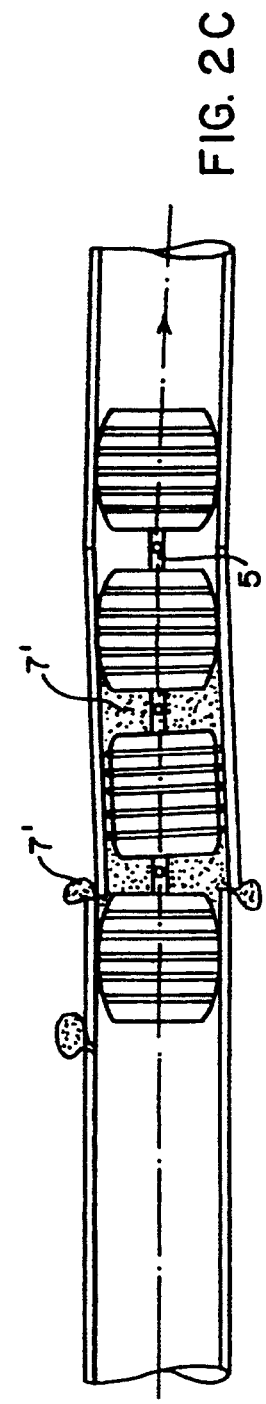
Figure 2D:
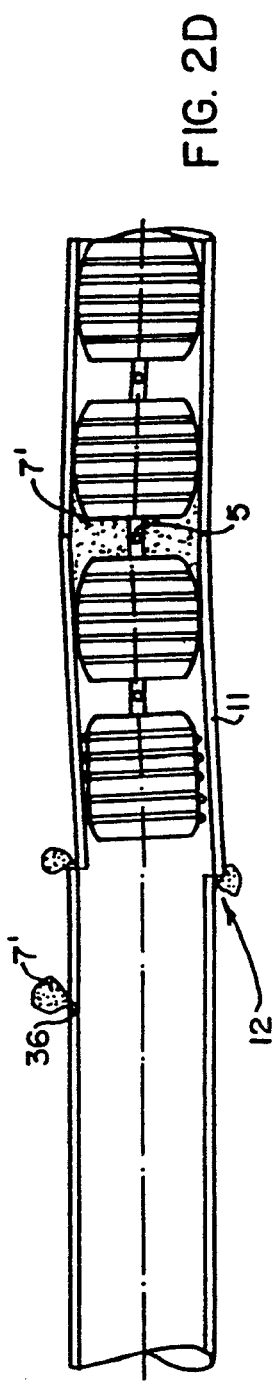

A further characteristic feature of the invention, which is illustrated in FIGS. 1A, 1D, and 1E, is that the repair device may, in addition, be provided with an inspection and position control device which is preferably in the form of small cameras 32 mounted on the extreme members 1 and 4 of the assembly and, if required, on the scraper member 25, and visual display units and control devices arranged above ground, which permit the injection chamber 10 to be placed accurately in the region of relatively large faults and, after repair, to examine the treated sections.

An additional characteristic feature of the invention, as is shown in FIG. 1C, is that the repair device is equipped with means for measuring the pressure of the filler material 7' in the region of the injection chamber 10, and comprises a pressure sensor 33 which is connected to evaluating means arranged above ground, the measuring device being able accurately to record the pressure exerted on the wall of the pipe 11, thus helping to avoid excessive pressure which may cause the pipe to burst.

The connection of the cameras 32 and the pressure sensor 33 to the corresponding measuring and utilization devices arranged above ground is provided by means of connecting lines 34 which pass through the interposed inflatable members 1, 2, 3 or 4, via one of their rigid pipes 16.

The invention extends to a method of repairing pipes 11, using a repair device as described above, which method is characterized in that it comprises, firstly, exploring by means of a camera the pipe 11, or the portion of pipe to be treated, by topographically recording major faults and by placing stops 35 in the openings of inlet pipes 14 of secondary pipes which open into the pipe 11, by means of a manipulator arm ahead of the front end camera, then introducing the repair device via a manhole, displacing the repair device along the portion of pipe 11 to be treated, and allowing sufficient stopping time in the region of the major faults which were previously recorded, the injection chamber 10 continuously being filled with filler material 7' during advancement of the repairing device, thus permitting the continuous repair of said pipe and, therefore, also the repair of faults which are, initially, not visible or detectable.

The repair operation may proceed either by the device being introduced into the pipe 11 via a first manhole, and by pulling it towards a second manhole by means of a pulling cable 9, or, in the case of a pipe 11 having only one manhole, by placing the device in position at the end of the pipe 11 remote from the manhole, and pulling it backwards by means of a pulling cable 9, in the direction of the manhole.

The filler material 7' which is used may advantageously be a thixotropic ready-to-mix mortar, which is water-resistant in the fluid condition as well as in the set condition.

As is best shown in FIGS. 2A to 2D, the passing of an obstacle by the assembly of inflatable members 1 to 4 is simple to carry out, while keeping the injection chamber 10 full and without involving a discharge of the filler material 7' into the pipe 11, by the successive, partial deflation of the inflatable members 1 to 4 when they pass the region of a projecting obstacle (shoulder 12).

The invention thus provides a device for the in situ repair of pipes 11, the interior of which cannot be examined personally, which makes it possible to repair, by the continuous application of filler material 7' to the wall, all sealing faults, whether apparent or not, in respect of a pipe 11 which comprises only one manhole or access and also in respect of a pipe which comprises more than one manhole or access.

In addition, due to its articulated design, the device may also be used in the region of bends 12' in the pipe.

In addition, due to the structure of the inflatable members 1 to 4 and the method of their assembly, it is readily possible to adapt the device for use with pipes 11 having different diameters, while also permitting an adjustment of the length of the injection chamber 10 depending on the dimensions, in the longitudinal direction of the pipe 11, of the sealing faults to be repaired, by simply changing the corresponding articulated tie rod 5.

Furthermore, since the injection chamber 10 is always filled with pressurized filler material 7', the repair device may also be used to repair pipes 11 which are subjected to ground water seepage.

In fact, since the injection chamber 10 is always full, water which is present in the pipe 11 and water which attempts to seep through the pipe in the region of the injection chamber is expelled, while the filler material 7' escapes through the sealing faults through which the seepage has taken place, and prevents the entry of water as soon as the filler material is applied, even before it has set.

It is to be understood that the invention is not restricted to the embodiment described herein with reference to the drawings. Modifications are possible, in particular in respect of the design of the various members, or by substituting equivalent techniques, without departing from the spirit of the invention.

What I claim is:

1. A repair device for the in situ repair of a pipe by the application of a filler material to the internal wall of the pipe, which device comprises an assembly of at least four short cylindrical, inflatable members each having a length of less than one-and-a-half times its diameter, which inflatable members in use define in the pipe a cavity for receiving the filler material, each pair of adjacent inflatable members being connected to one another by an articulated tie rod capable of transmitting a substantial axial force from one said inflatable member to the other whilst permitting the inflatable members to articulate freely with respect to one another, first duct means for conveying an inflating fluid to the inflatable members, and second duct means for conveying said filler material to said cavity.

2. A repair device according to claim 1, wherein the tie rod is articulated by having a cardan joint therein.

3. A repair device according to claim 1, wherein each inflatable member comprises an axially extending tubular support body, a plurality of rigid pipes each extending axially through the support body, from one end thereof to the other, an inflatable annular sleeve on the support body, and a pair of end plates, one at each opposite end of the support body, for locating the sleeve axially on the support body, the ends of the rigid pipes being secured to the end plates by means of detachable fasteners.

4. A repair device according to claim 1, wherein the annular sleeve has a plurality of axially spaced annular ribs on the outside thereof.

5. A repair device according to claim 1, wherein each tie rod is, at least at one end thereof, detachably connected to the respective inflatable member.

6. A repair device according to claim 1, wherein the outermost inflatable members are each provided with attachment means for securing a cable or chain thereto.

7. A repair device according to claim 1, wherein the first duct means comprises a flexible pipe for each of the inflatable members, whereby the inflatable members can individually be connected to a source of compressed fluid above ground.

8. A repair device according to claim 7, wherein the inflatable sleeves of said inflatable members are connected to the respective flexible pipes via one of said rigid pipes of any intervening inflatable member.

9. A repair device according to claim 1, wherein the second duct means is in the form of a semi-rigid pipe which is connected to one of said rigid pipes of one of the outermost inflatable members by means of a quick coupler.

10. A repair device according to claim 1, which further comprises a cylindrical scraper member which is provided with at least two axially spaced inflatable collars.

11. A repair device according to claim 10, wherein the scraper member is connected to said assembly of inflatable members by means of an articulated tie rod.

12. A repair device according to claim 10, wherein the inflatable collars are each provided on their outside surface with a reinforcing layer, and are mounted on a rigid hollow tube, the scraper member further comprising, for each of the collars, a pair of end plates for axially locating the collar on the tube, the end plates being detachably secured to the tube.

13. A repair device according to claim 12, wherein the scraper member comprises a spacer interposed between each pair of end plates.

14. A repair device according to claim 1, which further comprises inspection means including a camera carried on each of the outermost inflatable members.

15. A repair device according to claim 1, which comprises a pressure sensor for sensing the pressure of the filler material in the region of said cavity.

16. A method of repairing a pipe in situ, which comprises, firstly, exploring, by means of a camera, the pipe by topographically recording major faults and placing stops in any lateral pipelines leading into the pipe, then introducing a repair device via a manhole into the pipe, the repair device comprising an assembly of at least four short cylindrical, inflatable members each having a length of less than one-and-a-half times its diameter, so that the inflatable members define in the pipe a cavity for receiving a filler material, each pair of adjacent inflatable members being connected to one another by an articulated tie rod capable of transmitting a substantial axial force from one said inflatable member to the other whilst permitting the inflatable members to articulate freely with respect to one another, first duct means for conveying an inflating fluid to the inflatable members, and second duct means for conveying said filler material to said cavity, and displacing the repair device along the pipe while maintaining said cavity continuously filled with said filler material, and stopping the repair device in the region of each of the major faults which were previously recorded, for a sufficiently long time to repair the fault.

* * * * *